UNITED STATES PATENT OFFICE.

JONATHAN BURRAGE, OF ROXBURY, MASSACHUSETTS, ASSIGNOR TO
J. BURRAGE AND F. W. NEWTON.

IMPROVEMENT IN PROCESSES FOR MAKING VARNISHES.

Specification forming part of Letters Patent No. 10,654, dated March 14, 1854.

*To all whom it may concern:*

Be it known that I, JONATHAN BURRAGE, of Roxbury, in the county of Norfolk and State of Massachusetts, have invented a new and useful Composition or Varnish; and I do hereby declare that the same is fully described in the following specification.

In the preparation of the said varnish common crude turpentine, that by exposure to the air has become dried, oxidated, and parted with certain volatile properties is employed. By "common turpentine" I mean that from the *Pinus abies* or *Pinus silvestris*. To two hundred pounds of such add eighteen wine-gallons of the essential oil or spirits of turpentine and apply heat to the vessel containing the mixture until the said turpentine is dissolved by the spirits. Next strain the compound through cotton cloth or other suitable material, so as to remove the grosser impurities. This done, add to each one hundred gallons of the mixture about six pounds of white vitriol or sulphate of zinc, and after the same has been duly incorporated by stirring or otherwise the whole is to be exposed to the light for about a week or ten days until it has changed to a light or nearly white color or a very pale straw color. During the time the liquid is suffered to stand exposed to the light it will not only become bleached, but a separation of the oleaginous and other foreign matters will take place, such descending to the bottom of the mass and leaving the clarified or manufactured varnish on the top of it, from which it may be removed by a siphon or other suitable means. The drying property of the varnish is very much improved by the sulphate of zinc. The turpentine in a liquid state, as it first exudes from the tree, cannot be used to so good advantage in the manufacture of varnish as it can be after it has become exposed to the action of the atmosphere and dried or reduced to a hardened gum. Neither can the turpentine, deprived of its essential oil by artificial means, be employed to the advantage of that naturally dried by exposure to the atmosphere.

By taking the crude or naturally hardened turpentine and combining it with the essential oil of turpentine and sulphate of zinc in the proportions essentially as above specified, and suffering the whole to be exposed to the action of light in the manner as stated, a clear and beautiful varnish is produced—one not only much superior in many, if not all, respects to dammar, copal, or ordinary mastic varnish, but which can be made much cheaper than either of such. It is especially applicable to the white oxide of zinc, and with such produces a very fine paint that dries with much body and gloss. The slow action of the atmosphere on the turpentine during the process of drying it and divesting it of its essential oil prevents the formation of colophonic acid, which imparts to turpentine dried by artificial means or heat a peculiar brown color. This colophonic acid is largely produced by the action of heat on the turpentine, and gives to rosin its brown hue.

I am not aware that turpentine dried and bleached by exposure to air and light only has ever been used in making varnish, and it is turpentine so prepared and bleached or deprived of colophonic acid that I employ in the manufacture of varnish. The colophonic acid is very injurious to varnish, as its presence tends to produce the oxidation and discoloration that so soon occur after the application of it.

I am aware that the exudations from the *Pinus canadensis* and *Pinus picea* (which exudations are respectively known in commerce by the names of "Canada balsam" and "Venice turpentine") have been mixed with essential oil or spirits of turpentine in the manufacture of varnishes. I therefore do not claim such mixtures as forming part of my invention; nor do I claim the employment of sulphate of zinc, litharge, or magnesia in an oil for the purpose of imparting drying qualities thereto; nor do I claim in making a varnish the employment of a virgin turpentine, or that which is in the natural and liquid state it has when it exudes from the tree; but as by exposure of the crude or natural liquid turpentine of the *Pinus abies* or *Pinus silvestris* to the action of air and light for several weeks or months it becomes hard and brittle and decolorized and otherwise changed, or has its essential oil evaporated, and is otherwise purified of much that is objectionable in varnish, and in fact becomes another or highly improved article for the manufacture of varnish, and as such has never to my knowledge been used in making varnish, but only in the composition of plasters or for other purposes in medicine and in calico-printing and some other arts, it being known in commerce by the names of "gum-thust" or "gum-sap."

I claim as my invention—

The above-described process or mode of making varnish—viz., by combining gum-thust or gum-sap with the essential oil of turpentine and treating the mixture substantially as described.

In testimony whereof I have hereto set my signature this 7th day of June, 1853.

JONATHAN BURRAGE.

Witnesses:
R. H. EDDY,
F. P. HALE, Jr.